G. MILSOM & R. HENEAGE.
Culinary Vessel.
No. 214,833. Patented April 29, 1879.
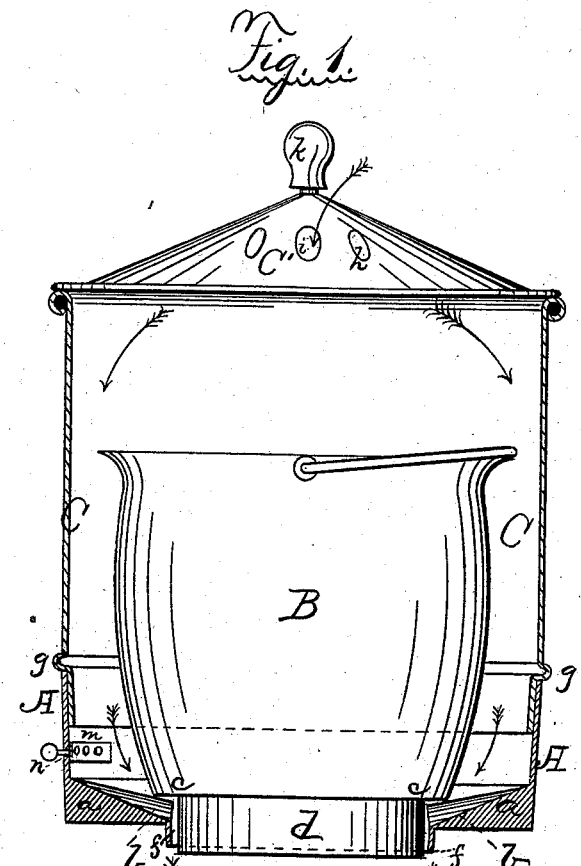
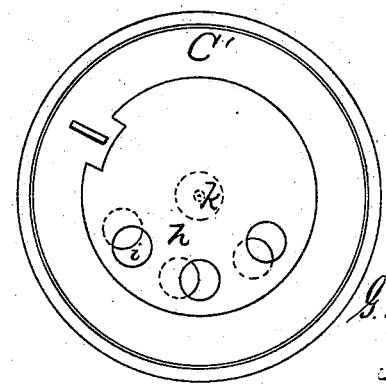

UNITED STATES PATENT OFFICE.

GEORGE MILSOM AND ROBERT HENEAGE, OF BUFFALO, NEW YORK.

IMPROVEMENT IN CULINARY VESSELS.

Specification forming part of Letters Patent No. 214,833, dated April 29, 1879; application filed February 15, 1879.

*To all whom it may concern:*

Be it known that we, GEORGE MILSOM and ROBERT HENEAGE, both of Buffalo, in the county of Erie and State of New York, have invented certain Improvements in Devices for Carrying off Vapors, Steam, and Odor from Culinary and other Vessels, of which the following is a specification.

This invention relates to a device to inclose (on a stove) any pot or other vessel used in cooking food, &c., the object being to prevent the escape of vapor and steam from the pots into the room while boiling clothes, vegetables, meats, &c., and at the same time draw down into the stove all odors and gases arising from cooking or boiling of different things, and by which all unpleasant smells, steam, &c., are kept from the room, and consequently the entire house, they being either burned up in the stove or drawn into the chimney.

The invention consists in a metal ring having an open bottom, and that sets into the stove hole or holes in the top of a stove, the inner surface of the ring being beveled down and provided with a series of lugs or projections, on which the shoulder of the bottom of a pot or other vessel sets, leaving thereby an air space or spaces between the bottom of the pot and this ring. Fitting closely into the ring is an upright metal jacket with a permanent or removable cover, the whole inclosing the pot or other vessel. In the cover is set a register consisting of air-openings, which are closed by a valve or slide, which admits air from the room, and in connection with the air-space between the bottom ring and the pot an inward suction or downward draft is created and kept up, which draws into the stove all the steam and odors which would otherwise escape. A register or sliding valve in the ring admits cold air to the pot when desired, all as hereinafter specified.

In the drawings, Figure 1 represents a side elevation, partly in section; Fig. 2, a bottom plan of the cover.

A represents the ring, made of cast metal, with an open bottom that sets into a stove hole or holes in the top of a stove. The inside surface or bottom $a$ of the ring slants downward, and lugs or upward projections $b\,b$ are attached to or form a part thereof, on which the shoulder $c$ of the culinary vessel B sets, with its fire-bottom $d$ projecting into the stove, as usual. By this arrangement an air-space or series of air-spaces, $f\,f$, between the lugs $b$ is provided, so that there may be a constant draft of air between the projecting bottom $d$ of the vessel B and the projecting bottom of the ring A, as shown at $f\,f$, and indicated by arrows.

C is a jacket that incloses the vessel B, and unites with the ring A by a joint at $g$ for convenience in taking out, so as to get at the pot B readily; otherwise the jacket and ring might be made in one piece. The jacket is provided with a cover, C', that either forms a part of the jacket or is removable, as a matter of convenience for looking into the vessel B, avoiding lifting the entire jacket off, and which completely envelops the vessel B, except the bottom in the stove, thereby shutting off all contact with the outer air; but in order to get an inward suction of the steam and odors arising from cooking, &c., we make a register, $h$, in the cover, consisting of one or more openings closed or unclosed by a valve or slide, $i$, operated, preferably, by the knob $k$ of the cover, which, by turning, will partly or completely uncover the openings, and the draft through the stove from the chimney will immediately suck down into the fire all odors, steam, condensations, &c., from the pot, and which are either at once destroyed by the fire or else escape only through the chimney, but in all cases are kept completely out of the room or rooms where the cooking or boiling is going on. All overflows of the pot also drop down inside onto the slanting bottom $a$ of the ring A, and run into the fire instead of onto the stove, as is now the case, and act on the fire to deaden it, which is important, as it thereby stops the boiling over for the time.

In the ring A is also placed a register, $m$, consisting of openings made in the side, with a slide or valve, $n$, to close or unclose them to admit cold air to the pot when the action is too active, serving as a damper or register. When this steam and odor jacket is first put over the pot the registers $h$ and $m$ are both shut until the contents of the pot get sufficiently heated to throw off vapor or steam; then the upper register, $h$, is opened, and the draft from the stove through the air space or spaces $ff$, drawing through the register $h$ in the cover, immediately sucks down all emanations, odors, &c., as before explained.

This register $h\ i$ could be placed in the side of the jacket; but we prefer it in the cover. This jacket may also be found useful in covering vessels that are used in preparing chemicals to prevent the outcome of poisonous or other gases.

I do not claim, broadly, a jacket or inclosing-cover for the purpose of shutting in or drawing in odors and steam, as such are old; but

What I claim is—

In combination with the jacket and cover C C', the bottom or ring A, provided with the slanting bottom $a$, lugs or ridges $b\ b$, which support the vessel B $d$ and form the air-spaces $f\ f$, and the register $m\ n$, all substantially as set forth.

In witness whereof we have hereunto signed our names in the presence of two subscribing witnesses.

GEO. MILSOM.
ROBT. HENEAGE.

Witnesses:
J. R. DRAKE,
T. H. PARSONS.